Mar. 27, 1923.
1,449,765
J. P. McLAUGHLIN
CABLE COUPLING
Filed Jan. 22, 1920
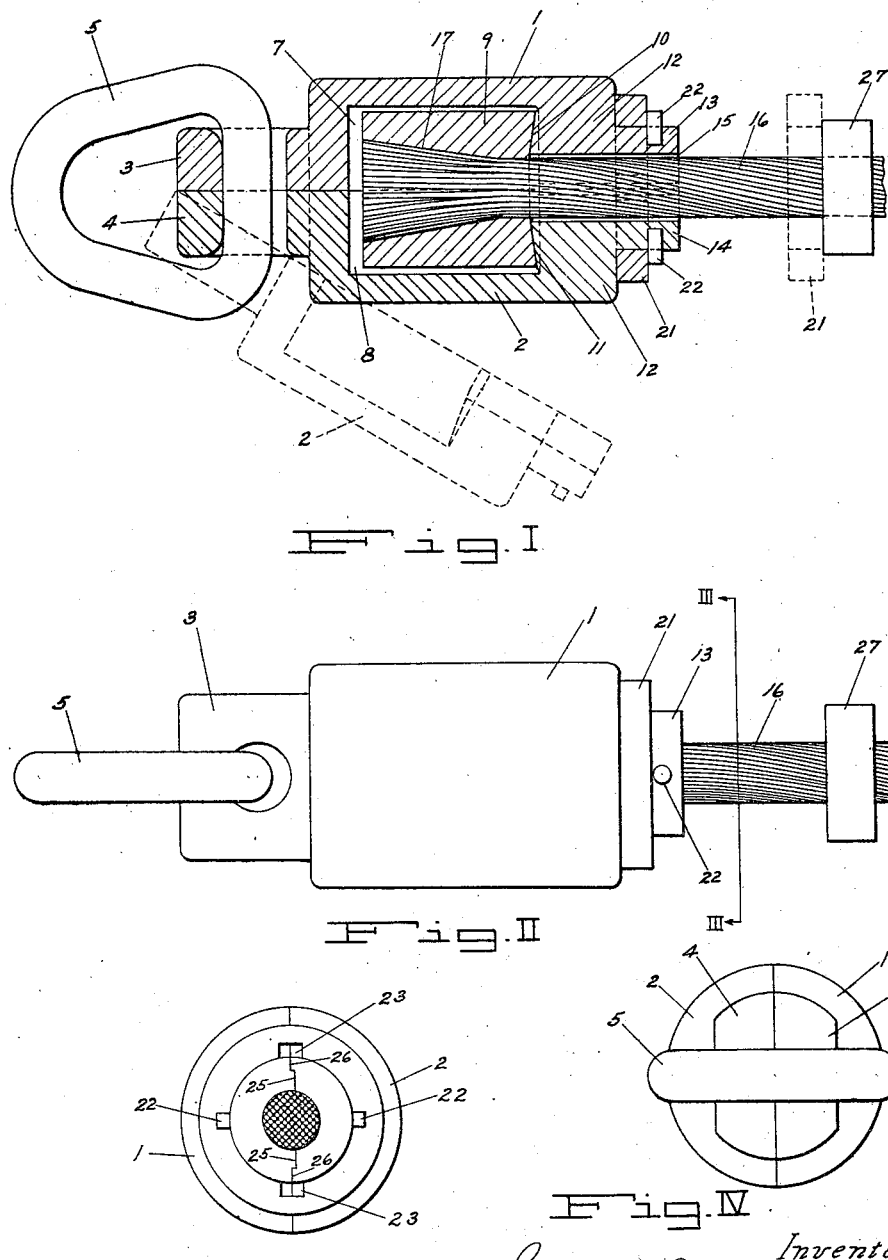

Patented Mar. 27, 1923.

1,449,765

UNITED STATES PATENT OFFICE.

JAMES P. McLAUGHLIN, OF PORTLAND, OREGON, ASSIGNOR OF ONE-HALF TO CHARLES D. WALKER, OF PORTLAND, OREGON.

CABLE COUPLING.

Application filed January 22, 1920. Serial No. 353,245.

*To all whom it may concern:*

Be it known that I, JAMES P. McLAUGHLIN, a citizen of the United States of America, and resident of Portland, in the county of Multnomah, in the State of Oregon, have invented certain new and useful Improvements in Cable Couplings, of which the following is a specification, reference being had to the accompanying drawing.

My invention relates to couplings for joining one cable to another or the end of a cable to itself to form a loop, and has for its object the production of such a device which may be depended upon securely to unite the parts connected by it in such a manner as to permit of their ready and convenient separation at will, to insure in service their continued union against adverse strain, and to provide for torsional movement of one part independently of the other.

My coupling is, in one aspect, a safety device especially adapted for use in logging operations to unite one end of a wire cable slidingly to the body of the cable in order to form a loop, and is thereby adapted to supply the place of a choker-hook. In that connection, it possesses a distinct advantage in that, unlike the ordinary choker-hook, it presents nothing to catch upon any obstruction in its travel in the woods, it being adapted, by reason of its construction, to run freely over any sheave, such as is ordinarily employed in logging operations, of that description with which my device is intended to be used. Moreover, by reason of the relief it affords against torsional strain generally, it eliminates an element of danger.

What constitutes my invention will be hereinafter specified in detail and succinctly set forth in the appended claims.

In the accompanying drawing,

Figure I is a longitudinal, diametrical section of my coupling, showing it in full lines as provided at one end with a coupling link in the position which it occupies under tension, and showing a short extent of cable connected with the coupling. In dotted lines, one member of the two-part coupling is shown open or dropped away from the other member, as upon its release therefrom after removal of the fastening ring which is shown in full lines in the engaging position and in dotted lines in the disengaged position.

Figure II is a top plan view of the subject matter of Figure I, complete, and taken at right angles to the view shown in Figure I.

Figure III is an end view of the subject matter of Figure II, taken on line III—III.

Figure IV is an end view of the subject matter of Figure II, looking towards the opposite end from that shown in Figure III.

Referring to the numerals on the drawings, 1 indicates one member and 2 the other of a coupling-shell the members being substantially, or save in one little detail, identical in construction. They are preferably made of cast or forged steel, although that is a mere detail of construction variable at pleasure.

The coupling-shell includes, at one end, a ring composed, preferably, of two ring-members 3 and 4, preferably formed integrally with the members 1 and 2, respectively. 5 indicates a link that is preferably three-sided, and which, passing through the co-registering openings of the respective ring-members 3 and 4, serves to join them together in service, and to perform the function of a hinge connection between the members 1 and 2 when they are opened as indicated, for example, by the dotted portion of Figure I.

The coupling-shell formed by the two members 1 and 2 is hollow, as shown in Figure I, being provided with a cylindrical cavity formed therein by the conjunction of the two semi-cylindrical cavities 7 and 8 of the members 1 and 2.

Loosely fitting within the cavity above described is a cylindrical block 9, having a dish-shaped end 10, that fits over a convex annular face 11 formed in the solid ends or heads 12 of the coupling-members 1 and 2, respectively. 13 and 14, respectively indicate extensions upon the head 12, which preferably are semi-cylindrical, and which, when united together, constitute a cylinder as is clearly shown in Figure III. A coaxial longitudinal bore 15 is provided through the conjoint heads 13 and 14, and the head 12. Its transverse diameter is variable in different sizes of my coupling to accommodate the size of a cable 16 loosely fitting within it. Coaxially with the bore 15, a flanged bore 17 is provided in the block 9, the flared end of the bore 17 being that farthest removed from the bore 15. Into the bore 17 the cable 16 is introduced and is firmly secured to it as by the process familiar in the art and known as babbitting.

The device, to the extent above described, illustrates a two-part hollow coupling whereof the shell constitutes one part and a loosely mounted cylindrical block, or swivel block within the hollow of it, constitutes the other part, to which the cable 16 is securely fixed. Tension upon the cable 16 causes the complementary faces 10 and 11 to engage securely one with the other and by such engagement only to hold the members 1 and 2 closed together in service. Said means of holding the members 1 and 2 closed together is ancillary to the holding function of a ring 21 that is loosely fitted to the external cylindrical contour of the extensions 13 and 14, and relieves the ring 21 of all heavy strain in use. Said extensions are provided, respectively, with radially projecting pins 22 which register, respectively, when the ring is properly applied to the conjoined extensions 13 and 14 of the members 1 and 2 with notches 23 in the ring 21. Consequently, the ring, when its notches 23 are in register with the pins 22, may be pushed against the head 12, as shown in Figures I and II, and, when turned to the position shown in Figure III, it serves securely to confine and hold the extensions 13 and 14 in close juxtaposition.

It is repeated that in service, nevertheless, when tension is applied to draw the cable 16 and the link 5 apart, no heavy strain may be brought upon the ring 21, but the block 9 is supported by the head 12, whose parts it serves to draw together through engagement of the faces 10 and 11, respectively. In this connection, it may be noted that the head 12 and the extensions 13 and 14 thereof are preferably united against transverse displacement as by corresponding and longitudinally overlapping ribs 25 and 26, formed in the abutting faces of the extensions 13 and 14, and extended, if preferred, between the two parts of the head 12. It is in this respect only, as was above suggested, that there is any difference between the structural details of the members 1 and 2. The ribs 25 and 26 are intended only to exemplify any transverse aligning device which may be used for the purpose.

The faces 10 and 11 may be formed solidly upon the block 9 and the head 12, respectively, if preferred and as shown in Figure I, but any suitable or ordinary anti-friction device may be operatively introduced between those surfaces, respectively, if desired.

Whenever it is desired to open the members 1 and 2, it is necessary, first, to slip the ring 21 from the extensions 13 and 14. This is accomplished by slacking the tension on the cable and bringing the notches 23 of the ring 21 into register with the pins 22 upon said respective extensions. In order to prevent the ring 21 from slipping too far on the cable 16, I prefer to provide a stop ring 27 upon the cable 16 and to secure it fixedly in place within easy reach of the coupling. The ring 21 is shown in Figure I in dotted lines as removed from the extensions 13 and 14 of the coupling members and in position against the ring 27.

In view of the foregoing the operation of my device may be briefly described as follows. The members 1 and 2, by aid of the link 5 securing the ring-members 3 and 4 together, may be fastened to the end of a cable or, if a loop connection is desired, the cable may be slidingly threaded through the link 5, or directly through the ring-members 3 and 4, if preferred, the link 5 being not indispensable. Afterwards, the block 9, having been previously fixed to the cable end 16, is inserted into the cavity provided for it in the coupling-shell, and the members 1 and 2 thereof are closed upon it and fastened by manipulation of the ring 21. The two parts of the coupling are thus secured together by a union which tension upon the cable 16 tends to render closer through engagement of the members 10 and 11. In operations requiring the employment of wire cables, there is a tendency in the travel of the cable to twist and to develop in it a stored up torsional force to a dangerous degree. By the use of the swivel block 9 within the coupling-shell, not only is all danger therefrom substantially eliminated, but the fastening and unfastening of the coupling as occasion requires is facilitated. Whenever it becomes necessary to unfasten the coupling, it is necessary only to relieve the tension on the cable when the members 1 and 2 may be easily opened in the manner already described. Also, because the engagement between the faces 10 and 11 will suffice to keep the members 1 and 2 closed, it is practicable to slip the ring 21 off the extensions 13 and 14 while the cable is taut. Afterwards, if tension on the cable be relieved, the members 1 and 2 will open automatically. This affords a distinct advantage if the cable line is operated under unfavorable conditions as in mud or water, sufficient to prevent convenient manipulation of the coupling members 1 and 2.

What I claim is:

1. In a cable coupling the combination with a hollow shell made of separable parts operatively hinged together at one end of a swivel block adapted to be secured to the end of a cable and rotatably mounted entirely within the hollow of the closed shell to which the cable has access.

2. In a cable coupling the combination with a hollow shell made of separable parts, of a swivel block adapted to be secured to the end of a cable and rotatably mounted entirely within the hollow of the closed shell and unitary means upon the shell for confining the parts thereof in the closed position and for releasing them at will.

3. In a cable coupling the combination with a hollow shell made of separable parts, of a swivel block adapted to be secured to the end of a cable and rotatably mounted within the hollow of the closed shell, and mutually engaging faces upon the block and shell, respectively, adapted by their engagement to hold the members of the shell closed together when a strain is put upon the cable.

4. The combination with a hollow coupling shell composed of separable members provided with extensions conjointly forming a cylinder, a radially projecting pin, and a ring loosely fitted to said cylinder and notched to pass said pin, of a swivel block fitted to enter the hollow of the shell, a cable secured thereto, and a stop ring for the notched ring secured to the cable.

5. The combination with a coupling shell composed of a plurality of hollow members provided at one end, respectively, with ring members, of a swivel block adapted to be secured to the end of a cable and rotatably mounted within the shell, a coaxial bore in the shell provided in the end thereof opposite the ring members, and adapted to receive the cable when the swivel block is in place in the shell.

6. In a cable coupling, the combination with a hollow shell consisting of a plurality of parts movably joined together at one end of the shell, of a swivel block adapted to be secured to the end of a cable and rotatably mounted in the closed shell, and means at the end of the shell opposite the end above named, for closing and releasing at will the free ends of the parts of the shell.

In testimony whereof I have hereunto set my hand in the presence of two subscribing witnesses.

JAMES P. McLAUGHLIN.

Witnesses:
 JOHN B. CLELAND,
 JOSEPH L. ATKINS.